United States Patent
Pooley

(10) Patent No.: US 10,177,608 B2
(45) Date of Patent: Jan. 8, 2019

(54) SYSTEM PROVIDING INDUCTIVE TRANSMISSION OF POWER AND DATA THROUGH A PERMEABLE CONDUCTIVE BARRIER LAYER

(71) Applicant: The Technology Partnership PLC, Royston, Hertfordshire (GB)

(72) Inventor: David Pooley, Royston (GB)

(73) Assignee: The Technology Partnership PLC, Royston, Herfordshire (GB)

( * ) Notice: Subject to any disclaimer, the term of this patent is extended or adjusted under 35 U.S.C. 154(b) by 592 days.

(21) Appl. No.: 14/359,481

(22) PCT Filed: Nov. 21, 2012

(86) PCT No.: PCT/GB2012/052872
§ 371 (c)(1),
(2) Date: May 20, 2014

(87) PCT Pub. No.: WO2013/076474
PCT Pub. Date: May 30, 2013

(65) Prior Publication Data
US 2014/0339914 A1    Nov. 20, 2014

(30) Foreign Application Priority Data
Nov. 21, 2011    (GB) .................................. 1120036.7

(51) Int. Cl.
*H02J 50/10*    (2016.01)
*H02J 50/70*    (2016.01)
*H02J 50/90*    (2016.01)
*H02J 5/00*    (2016.01)

(52) U.S. Cl.
CPC .............. *H02J 50/90* (2016.02); *H02J 5/005* (2013.01); *H02J 50/10* (2016.02); *H02J 50/70* (2016.02)

(58) Field of Classification Search
CPC .................................. H02J 5/005; H02J 50/10
See application file for complete search history.

(56) References Cited

U.S. PATENT DOCUMENTS

| 4,679,560 | A | 7/1987 | Galbraith |
| 2002/0092353 | A1* | 7/2002 | Passarelli, Jr. ....... G01N 29/223 73/643 |
| 2003/0210106 | A1 | 11/2003 | Cheng et al. |

(Continued)

FOREIGN PATENT DOCUMENTS

| GB | 2388716 A | 11/2003 |
| WO | 2008003972 A1 | 9/2010 |

(Continued)

*Primary Examiner* — Jared Fureman
*Assistant Examiner* — Emmanuel R Dominique
(74) *Attorney, Agent, or Firm* — Lowe Graham Jones PLLC

(57) ABSTRACT

A wireless power transmission system is designed to transmit power through a permeable conductive barrier layer. The system comprises a power transmitting circuit including a first inductive coil. A power receiving circuit includes a second inductive coil located on the opposite side of the barrier layer to the first inductive coil. A biasing magnet or electromagnet is provided and characterised by its ability to substantially saturate the magnetisation of the barrier layer in a region adjacent to the first and second inductive coils.

18 Claims, 7 Drawing Sheets

(56) References Cited

U.S. PATENT DOCUMENTS

| | | | |
|---|---|---|---|
| 2004/0232845 A1 | 11/2004 | Baarman et al. | |
| 2009/0134881 A1* | 5/2009 | Tachizaki | B60L 3/0023 |
| | | | 324/551 |
| 2010/0254221 A1* | 10/2010 | Smith | B06B 1/0215 |
| | | | 367/137 |
| 2012/0025844 A1* | 2/2012 | Morita | B60L 3/0023 |
| | | | 324/538 |
| 2012/0112552 A1* | 5/2012 | Baarman | H02J 7/025 |
| | | | 307/104 |
| 2012/0235636 A1* | 9/2012 | Partovi | H02J 7/025 |
| | | | 320/108 |
| 2012/0245457 A1* | 9/2012 | Crowley | A61B 8/12 |
| | | | 600/424 |

FOREIGN PATENT DOCUMENTS

| | | |
|---|---|---|
| WO | 2010096917 A1 | 9/2010 |
| WO | WO2013009276 * | 7/2011 |
| WO | 2012040548 A1 | 3/2012 |

* cited by examiner

SYSTEM PROVIDING INDUCTIVE TRANSMISSION OF POWER AND DATA THROUGH A PERMEABLE CONDUCTIVE BARRIER LAYER

PRIORITY CLAIM

This application is a § 371 National Stage Application of International Application No. PCT/GB2012/052872, filed Nov. 21, 2012, and entitled "SYSTEM PROVIDING INDUCTIVE TRANSMISSION OF POWER AND DATA THROUGH A PERMEABLE CONDUCTIVE BARRIER LAYER," which is an International Stage Filing of GB Application No. 1120036.7, filed Nov. 21, 2011, and entitled "METHOD OF PROVIDING POWER AND DATA." Accordingly, the present application claims priority to and the benefit of the filing dates of International Application No. PCT/GB2012/052872, and GB Application No. 1120036.7, which are incorporated herein by reference in their entireties.

This invention relates to the transfer of power and data through conductive and magnetic materials. Inductive power and data transfer through steel is the main application of this invention, although the same techniques could be used to transfer power and data through other permeable materials.

Inductive links are widely known as a method to transfer power and data through a barrier layer (or across an air or vacuum gap). Typically, a pair of coils are located on either side of the barrier. An alternating current is passed through a primary coil on the one side of the barrier. The mutual inductance between the coils means that an emf is induced in the secondary coil on the other side of the gap. This is arrangement is effectively a poorly-coupled transformer. One or both sides of the circuit often employ a resonant capacitor to recover energy that is not transferred across the barrier. Voltage or current levels can be modulated to allow data transfer to occur alongside power transfer. This method has been employed, for example, in inductive links to transmit power to and establish either 1-way or 2-way communications with implanted medical devices (e.g. U.S. Pat. No. 4,679,560 "Wide Band Inductive Transdermal Power and Data Link") and to allow cable-free charging of handheld electronic devices such as mobile phones (e.g. U.S. Pat. No. 6,906,495 "Contact-less power transfer"). Power levels for the power transfer can vary widely, but the transferred power is typically used to power an electronic circuit, and so power levels can be in the range of microwatts to kilowatts, with power levels from a few milliwatts to a few watts being common requirements.

Inductive power and data transfer becomes much more difficult when the barrier layer includes an electrically conductive material. Such materials are liable to absorb or reflect incident electromagnetic energy, reducing the efficiency of inductive power transfer and reducing the signal level of the data transfer. Typically, with a few millimetres of metal between the primary and secondary coils, power transfer efficiencies and data rates become too low to be of practical use. Materials that are both magnetically permeable and conductive, including several metals (such as structural steels) are particularly difficult to use, because the combination of conductivity and permeability substantially reduces the thickness through which electromagnetic energy of a given frequency will penetrate (which thickness is conventionally referred to as the 'skin depth' of the material at that frequency).

Permeable and conductive metals such as magnetic steels are often used in housings, pipework and vessels, for example because of their excellent mechanical properties and relatively low cost. In many such applications, it is desirable to transfer power and data through such metals, as it is not practical to provide electrical feedthroughs and the metals are not easily substituted.

The objective of this invention is to provide a method of transferring power and data though permeable conductive materials such as magnetic steels. Potential application areas are wide and varied and a few examples are included here. However, this should not be considered to be an exhaustive list, and other applications will be apparent to those skilled in the art. Applications include, powering and interrogation of sensors through steel for automotive, railway and aerospace applications, power and data transfer through steel reactor vessels and/or pipework, power and data transfer through vacuum and pressure vessels, power and data transfer across isolation gaps and vacuum insulation gaps, power and data transfer through explosion-proof housings, power and data transfer through food processing and/or biological processing vessels and/or pipework conveying feedstock to/from such vessels and power and data transfer through steel casework of handheld electronic devices.

This invention describes a method of transferring power and data through a barrier layer of a permeable conductive material (typically a magnetic steel). According to the invention, a DC bias field is added to an AC inductive power and/or data transfer field in order substantially to saturate the barrier material and reduce its effective permeability. This, in turn, increases the skin depth and hence improves the power transfer efficiency and communications signal level.

According to the present invention there is provided a wireless power transmission system, designed to transmit power through a permeable conductive barrier layer, comprising:

a power transmitting circuit including a first inductive coil;

a power receiving circuit including a second inductive coil located on the opposite side of the barrier layer to the first inductive coil; and a biasing magnet or electromagnet, characterised by its ability to substantially saturate the magnetisation of the barrier layer in a region adjacent to the first and second inductive coils.

This invention uses a primary coil on one side (the 'primary side') of a barrier layer of a permeable conductive material (typically a magnetic steel) to transmit power and, optionally, data and a secondary coil on the other side of said barrier layer (the 'secondary side') to receive power and, optionally, data transmitted through said barrier layer. The secondary coil or an auxiliary coil on the 'secondary side' can also send data back to the primary coil or to an auxiliary coil on the primary side. The simplest implementation (without auxiliary coils), in which the secondary coil sends data back to the primary coil may operate, for example, by load modulation in which a change in power or impedance can be detected on the primary side. The 'transmit' and 'receive' functions of the primary and secondary coils may be reversed, in systems where bi-directional power or data transfer is required. A strong DC bias field is used to substantially saturate the magnetisation of the barrier layer. This bias field may be applied from either the primary side or the secondary side, and may be generated either by a permanent magnet or an electromagnet.

The present invention will now be described with reference to the accompanying drawings, in which:

FIG. 1 graph of a BH curve for a material;

Figure 8A:
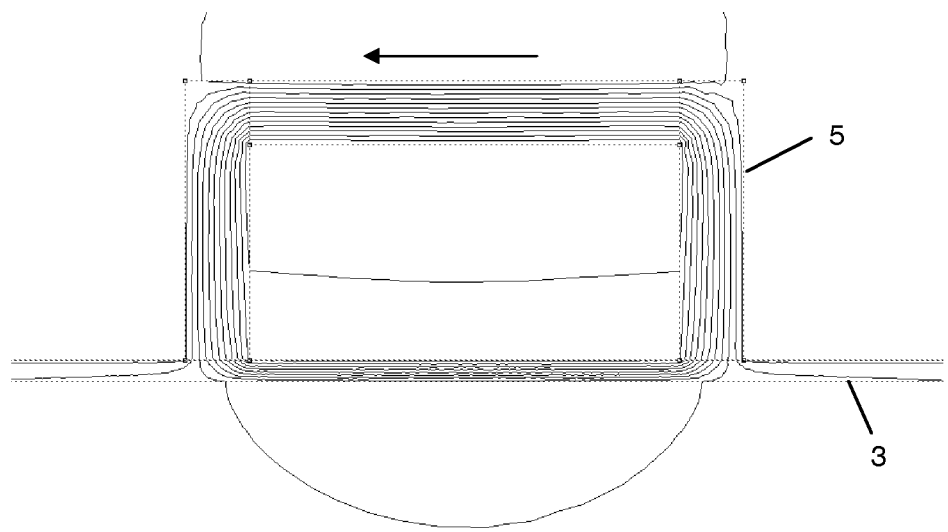
Figure 9:
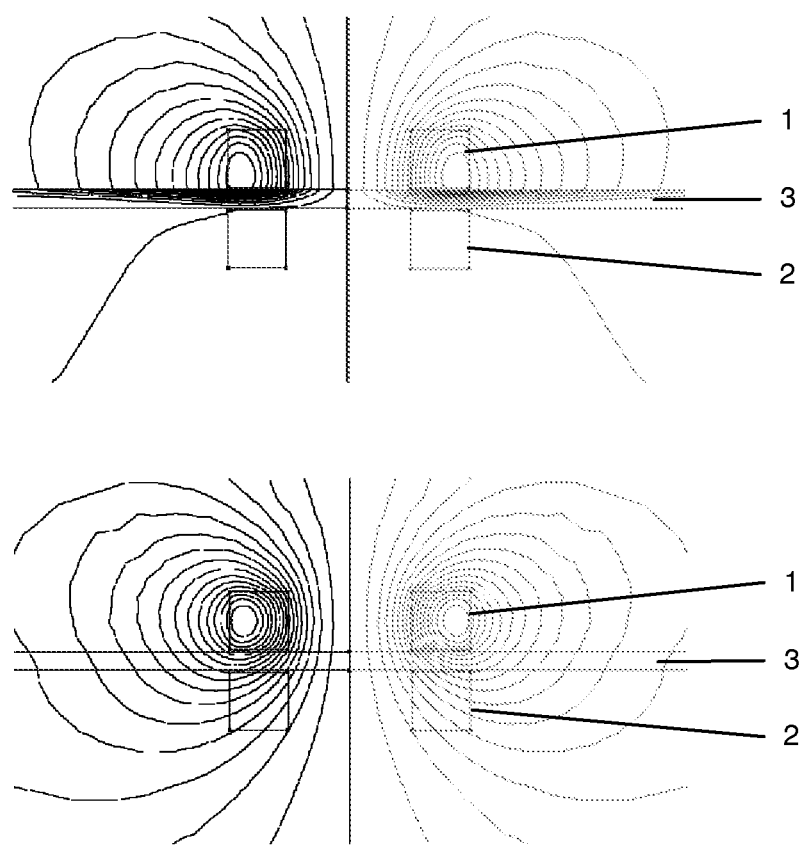
Figure 10:
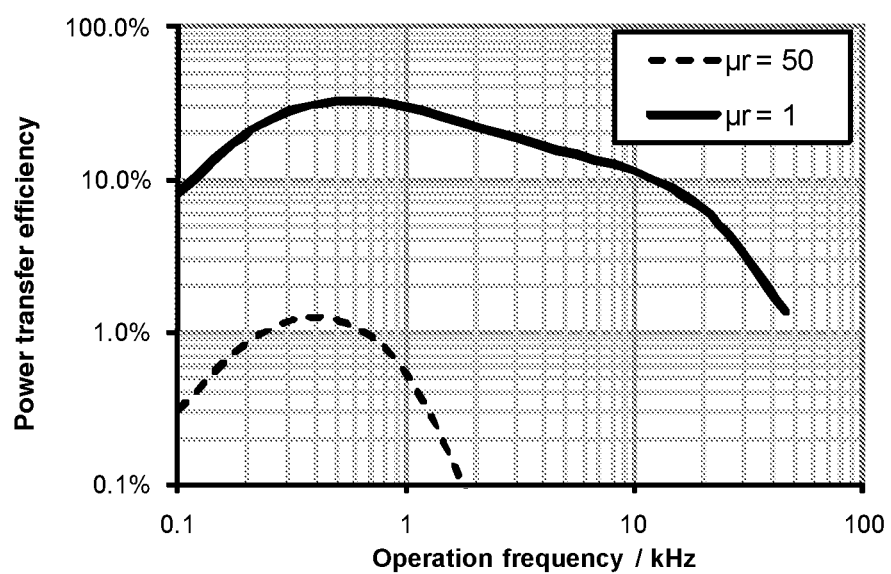

FIGS. 8A and B show data relating to simulations of saturations of a magnetic steel barrier layer;

FIG. 9 is a simulation of an AC magnetic field penetration through un-saturated and saturated magnetic steel; and FIG. 10 shows simulated power transfer efficiency that is frequency for an example of the present invention.

Prior to describing the invention in detail it is worthwhile given some technical background.

The skin depth, $\delta$, characterises the depth to which electromagnetic energy will penetrate through a material. This is given by:

$$\delta = \sqrt{\frac{1}{\sigma \mu_0 \mu_r \pi f}}$$

Where, $\sigma$ is the conductivity of the material, $\mu 0$ is the permeability of free space, $\mu r$ is the relative permeability of the material (and the product $\mu r.\mu 0$ is the absolute magnetic permeability of the material), and f is the frequency of the incident electromagnetic field.

Non-magnetic materials have relative permeability of $\mu r=1$. Ferromagnetic (magnetic) materials can have relative permeabilities $\mu r$ of several thousand. In accordance with the above equation for $\delta$, this means that such magnetic materials have much smaller skin depths compared to non-magnetic materials with similar conductivities.

Figure 1:
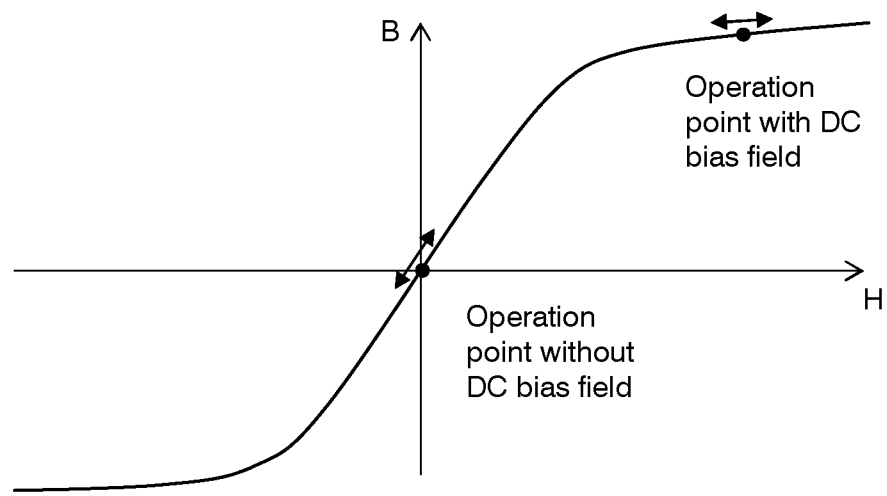

The absolute and relative permeability of a material can be determined from the gradient of its magnetisation (B-H) curve. A simplified B-H curve is shown in FIG. 1. This shows the applied magnetic field (H) on the horizontal axis and the magnetic flux density (B) in a typical soft magnetic material on the vertical axis. The permeability $\mu r.\mu 0$ is given by the change in B divided by the change in H in the region of operation and the relative permeability can thereby be determined by dividing by the constant $\mu 0$. Therefore, consider the case where a relatively small AC magnetic field $h_0 e^{i\omega t}$ (where $\omega=2\pi f$ and t denotes time) is applied with or without a large DC bias field $H_0$. Without DC bias field $H_0$, $h_0$ causes large fluctuation in magnetic flux density as shown by the double-headed arrows at the low-field region of the B-H curve. The high gradient in that region means that the permeability experienced by the AC field $h_0 e^{i\omega t}$ is high, so AC field $h_0 e^{i\omega t}$ is effectively screened by the material, through which it therefore can convey very little power. However, in the case where there is a high DC bias field H0, $h_0 e^{i\omega t}$ causes only small fluctuation in magnetic flux density as shown by the double-headed arrows at the high-field region of the B-H curve. That low gradient means that the permeability experienced by the AC field $h_0 e^{i\omega t}$ is low; therefore the AC field can now be transmitted more effectively through the material and convey significant power.

This invention therefore uses a strong DC bias field to saturate the barrier material, reducing the effective AC permeability seen by an AC field $h_0 e^{i\omega t}$ and increasing the skin depth. This increases the power transfer efficiency and data rate that can be achieved.

This invention uses a primary coil to transmit power and data, a barrier layer of a magnetic material, typically magnetic steel, and a secondary coil to receive power and data. The secondary coil can also send data in response, for example by load modulation, which can be detected on the primary side by a change in power or impedance. The functions of the transmit and receive coils can be reversed, if bi-directional power transfer is required.

The attenuation of signals passing through the barrier layer can be quite high in typical configurations, so the preferred mode of operation is to serialise the power and data transfer. This is described in the context of supplying power to a wireless sensor node on the secondary side, which then makes a measurement and returns the measured data. Firstly, the primary coil is energised to supply power to the secondary (typically an AC signal at around 500 Hz). Some data may also be transmitted from the primary by amplitude modulation. This might include, for example, a request for particular data to be returned or a data encryption key. The secondary side electronics stores some of the power provided. Once the primary has stopped supplying power, the secondary then sends data in response, typically as a modulated 500 Hz signal. A key advantage of this scheme is that the data returned from the secondary is much easier to detect, since the power transfer is not active at the same time as the secondary is transmitting data.

An alternative communications scheme uses amplitude shift keying (ASK) to communicate from the primary to secondary, combined with load shift keying (LSK) to communicate from the secondary to the primary. This can be implemented with very low cost and is already widely used in inductive RFID systems operating at 125 kHz and 13.56 kHz. Other communications schemes could also be used with this invention, for example, using frequency shift keying (FSK) or phase shift keying (PSK) on the primary and/or secondary sides.

Figure 2:
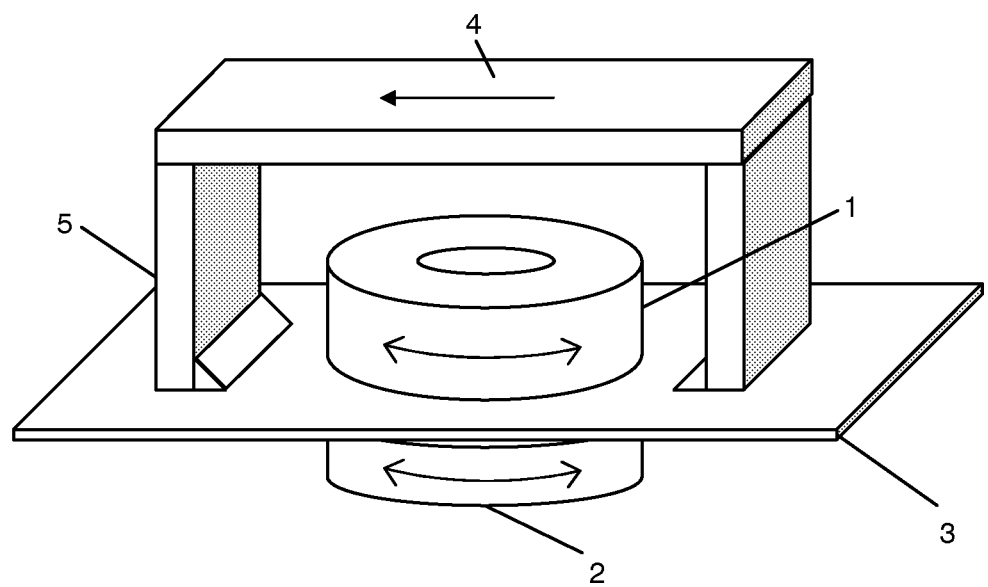
FIG. 2 is a schematic diagram of an example of the present invention.

One embodiment of the present invention is shown in FIG. 2. This embodiment uses circular coil 1,2 on either side of a barrier layer 3 to perform conventional AC inductive power and data transfer functionality. A DC bias field 4 is produced by a separate magnetic yoke 5. This separate DC bias field arrangement is convenient as it allows the DC and AC parts of the system to be optimised separately. The DC part can be designed with flux concentration to get the barrier layer 3 as close as possible to saturation, whereas the AC part can be designed for maximum power transfer efficiency. The design can also be modular, allowing a permanent magnet 5 or electromagnet (not shown) to be used to generate the DC bias field, as appropriate for a particular application.

It is beneficial for the DC bias field 4 to be switchable, for example, where one or both coils 1,2 are movable. Electromagnets are inherently switchable and the field strength is typically limited by losses in the electromagnet coil, hence tend to be more appropriate in systems where there is plenty of power available on the primary side or where field strengths are higher than can be readily achieved using permanent magnets. Where a permanent magnet 5 is used to generate the bias field 4, this can be made switchable to facilitate separation of the device from the barrier layer. Switching can be achieved, for example, by mechanically rotating half of the DC bias magnet 5 in order to reverse the polarity, by reversing the polarity of half of the magnet using a short pulse from an electromagnet, or by temporarily cancelling out the magnetic field using an electromagnet. Switched permanent magnet approaches have the advantage of lower power consumption compared to the use of an electromagnet.

Figure 3:
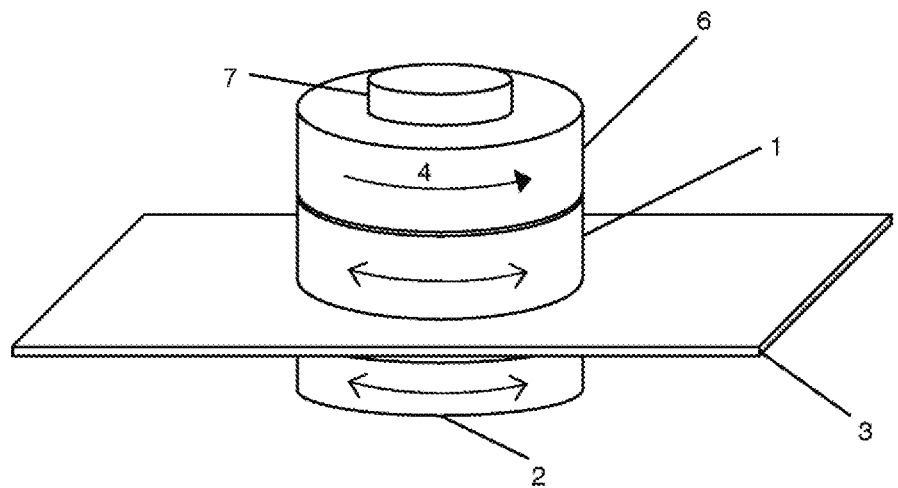
FIG. 3 is a schematic diagram of a second example of the present invention.

Several alternative geometries are possible for implementing this invention. An alternative configuration is shown in FIG. 3. This arrangement has the advantage that it is very compact. As shown, an electromagnet coil 6 is energised with a DC current. The resultant DC magnetic field 4 is guided into the barrier later 3 through a permeable core 7. This saturates the barrier layer 3 in the same region where the AC field is strongest. A pot-core arrangement (not shown) can be used to provide a return path for the flux. This increases efficiency and reduces stray field, but takes up extra space and uses more material.

As a variant on this, the DC bias current and AC transmit current can be passed through the same primary coil. This reduces the number of parts, but requires more sophisticated drive circuitry to combine the DC and AC signals efficiently. Another variant is to replace the permeable core and electromagnet coil with a cylindrical permanent magnet located in the centre of the AC primary coil. This approach can be even more compact, provided the permanent magnet is strong enough for a particular application, and is not demagnetised by the AC field.

Another variant is to replace the permeable core and electromagnet coil with a cylindrical permanent magnet located in the centre of the AC primary coil. This approach can be even more compact, provided the permanent magnet is strong enough for a particular application, and is not demagnetised by the AC field.

Figure 4:
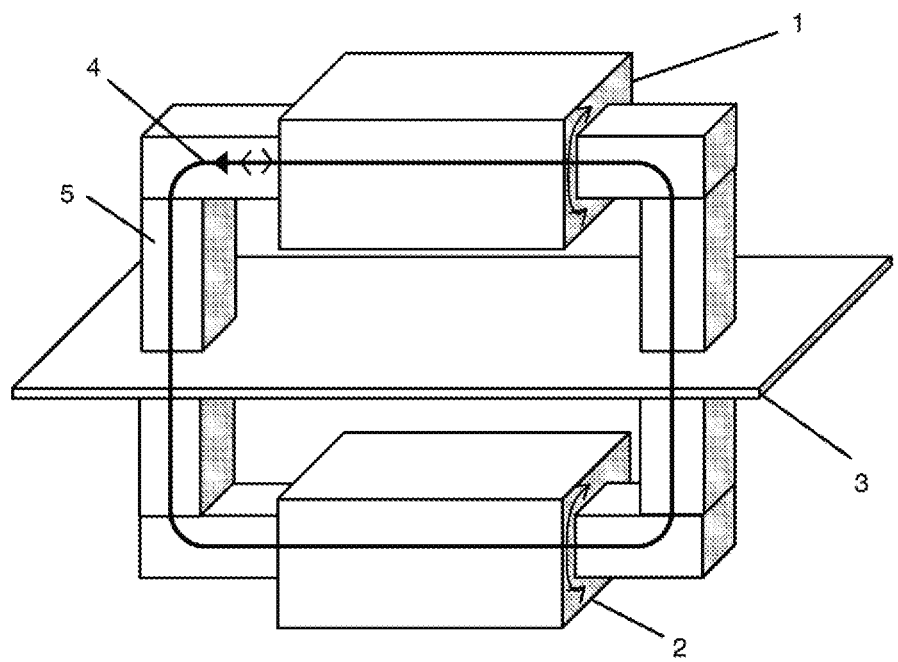
FIG. 4 is a schematic diagram of a third example of the present invention

Another alternative configuration is shown in FIG. 4. This arrangement has the advantage that it uses a closed magnetic circuit configuration that is capable of producing a more complete saturation of the barrier layer. In this embodiment, the DC bias field and AC power transfer filed both circulate in the same magnetic yoke. For complete saturation of the barrier layer, and hence high power transfer efficiency, the cross-sectional size of the yoke is preferably a multiple of two to ten times larger than the thickness of the barrier layer. As with the previous configuration, the bias field may be provided by permanent magnets on one or both sides of the barrier layer or by an electromagnet, which would most likely be located on the primary side, where more power is usually available.

In order for this invention to function, the bias field 4 does not need to be completely static, it just needs to have a large enough amplitude to perform the function of opening a 'window' of transmission in the barrier layer. Preferably the bias field 4 should operate at a much lower frequency than the AC inductive field, in order to minimise power consumption and to ensure that the bias field 4 propagates through the whole thickness of the barrier layer 3. For example, in some applications it may be preferable to generate the bias field 4 using a mains electricity powered electromagnet, which is a readily available source of energy at a frequency of 50/60 Hz, and use an inductive field at a higher frequency, typically in the 500 Hz-10 kHz range.

Figure 5:
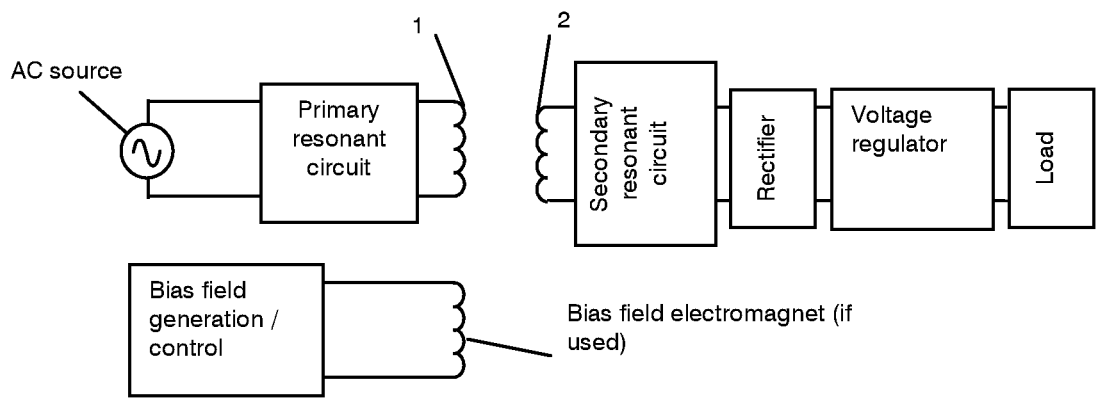
FIG. 5 is a schematic diagram showing an example system configuration of the present invention.

An example system configuration for the wireless power transfer system is shown in FIG. 5. Alternative circuit topologies for wireless power transmission are well-known and may also be usable in conjunction with this invention. Communications and control electronics are omitted for clarity. The bias field generation/control circuitry is only necessary if an electromagnet is used to generate the bias field. In a preferred implementation of this invention, the alternating current is generated by a half-bridge inverter, the primary side resonant tank circuit comprises a series resonant capacitor, the secondary resonant circuit comprises a series resonant capacitor, the rectifier is a diode bridge and the voltage regulator is a linear regulator. In applications where efficiency is critical, these components can be replaced by more efficient alternatives, such as synchronous rectifiers and switched-mode regulators. Additional filter stages and/or a centre-tapped coil may be included on the primary side to improve electromagnetic compatibility.

Figure 6:
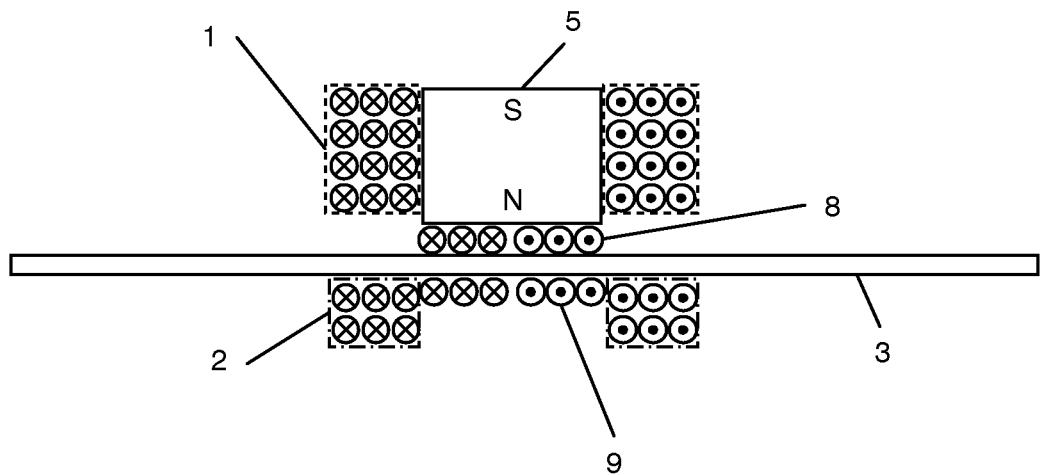
FIG. 6 is a schematic diagram of an example of the present invention using EMAT transducer methods.
Figure 7:
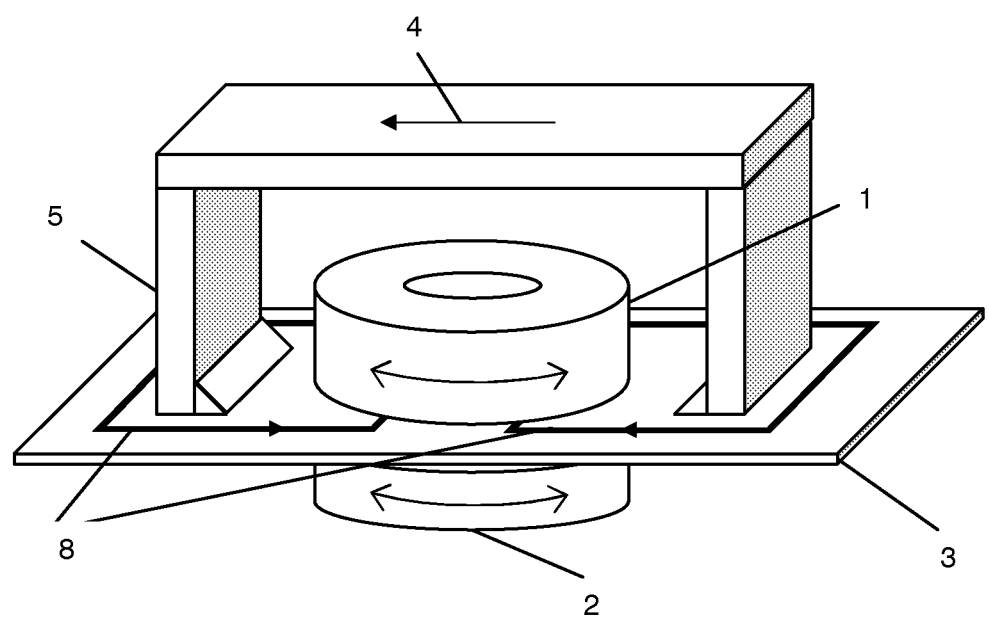
FIG. 7 is a schematic diagram of a second example of the present invention using EMAT transducer methods.

The hardware requirements for the provision of both DC and AC fields are similar to those required for an electromagnetic acoustic transducer (EMAT). An EMAT uses a DC magnetic field, in combination with induced alternating eddy currents to produce alternating Lorentz forces (along with magnetostrictive forces) in a target material, generating acoustic waves. Another alternative embodiment of this invention uses the EMAT method to generate acoustic waves as an alternative channel for getting data through the barrier layer. The preferred method of implementing this is to use a DC bias field to saturate the barrier layer, a low frequency AC field for inductive power transfer, and a higher frequency AC field for acoustic data transfer. This enables higher data rates to be used than are possible with inductive coupling alone. This is a very attractive combination, as it can be implemented with very little additional hardware. An implementation of this is illustrated in FIG. 6. The system is illustrated schematically in cross-section, with the parts in this implementation having circular symmetry. Where constraints on efficiency and/or communications signal levels are not critical, it may be practical to combine the functions of both primary side coils into a single primary coil and to combine the functions of both secondary side coils into a single secondary coil. An alternative configuration, also including EMAT coils is shown in FIG. 7. This embodiment uses a "figure-of-8" EMAT coil on both the primary side and a similar coil on the secondary side (not shown). Many other EMAT coil configurations have also been demonstrated, and could serve a similar purpose to the examples shown here.

In principle, some power transfer could be also be routed through this alternative acoustic channel. This additional functionality may be beneficial, for example, if the system has to function with a variable barrier layer thickness and/or material properties. However, power transfer efficiencies are likely to be limited to fairly low levels using this approach because of the inherent inefficiency of the electromagnetic to acoustic energy conversion processes.

Figure 8B:
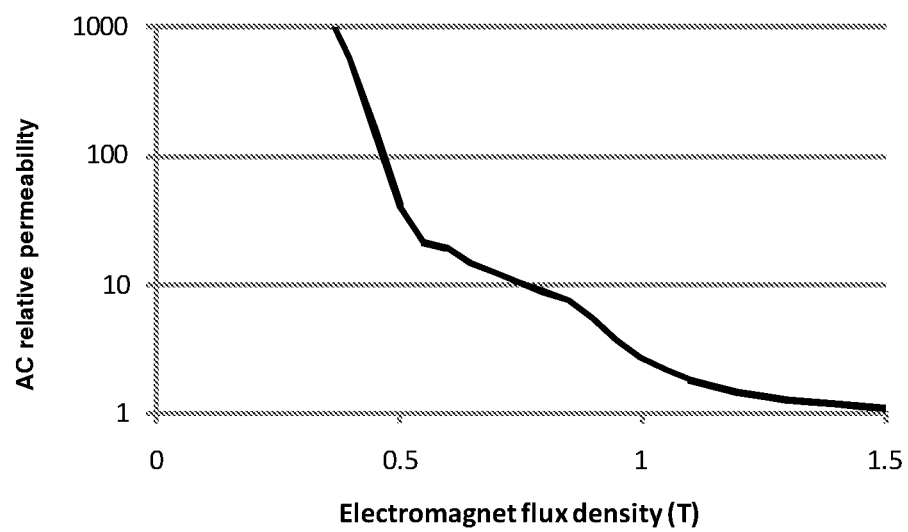

Saturation magnetisation of magnetic (400-series) stainless steels are typically around 1.5T and for steels designed for their magnetic properties can be around 2T. Saturation behaviour for a magnetic stainless steel has been simulated for a magnetic yoke arrangement similar to that illustrated in FIG. 7. The bias field simulation results are illustrated in FIG. 8(a), which shows the simulated geometry of the bias magnet on a steel barrier layer including magnetic flux lines. The top bar of the magnet yoke is magnetised with a flux density of 1T. In this design, the barrier thickness is 5 mm and the electromagnet yoke cross-sectional width is 15 mm. This size difference produces a concentration of the field in the barrier layer (by around a factor of 3), as can be seen from the increased density of flux lines within the barrier. This reduces the required magnet flux density and means that the yoke material is not saturated. FIG. 8(b) shows the effective AC permeability within the barrier layer as the bias magnet strength is increased. We can see from this plot that for this amount of field concentration, a bias magnet strength of around 1 T is able to reduce the effective AC relative permeability to around 3, which is likely to be sufficient for many applications. This magnet strength can be achieved using rare earth permanent magnets (neodymium-iron-boride or samarium-cobalt). For an electromagnet, this corresponds to about 5000 amp-turns. Some applications may be able to work with a lower magnet strength of around 0.5T, whereas some applications will need to reach an effective AC relative permeability close to 1, and may use a magnet strength of around 1.5T. Of course, for designs with different amounts of field concentration in the barrier layer, different magnet strengths will be required.

Simulations for AC magnetic field penetration through un-saturated and saturated magnetic steel barrier layers are shown in FIG. 9. The increased field penetration through the saturated material can be clearly seen.

Power transfer efficiency calculations for a 50 mm diameter coil and 5 mm thick steel barrier layer are shown in FIG. 10 These indicate a preferred operating frequency of around 500 Hz for this particular combination of coil geometry and barrier layer properties. The power transfer efficiency improves dramatically as the effective permeability reduces due to saturation. Inductive power transfer frequencies in the range 50 Hz to 50 kHz are likely to be suitable for most applications. A higher operating frequency will generally be preferred for smaller systems and a lower operating frequency for larger systems, due to skin depth, cost and size constraints.

This invention can also be used as part of a sensor system, capable of operating through a barrier layer of permeable steel (or other magnetic material). The most flexible embodiment would be to use the communication channel to transmit sensor data from a separate sensing circuit on the secondary side (which is powered by the inductive power transfer). A simpler embodiment is to attach a sensitive circuit component, such as a thermistor, to the secondary coil. The change in impedance can them be measured from the primary side, due to the coupling between the primary and secondary coils. If the secondary coil is free to move, then the system can be used as a position sensor for the secondary coil. In this application a resonant capacitor can be attached to the secondary coil in order to increase the size of the measured signal. If a conductive liquid is present on the secondary side, then the system can be used as a liquid level sensor.

Another possible application of this invention is to configure the secondary coil as an inductive RFID tag. The DC bias field from the primary side then allows the RFID tag to be read through a layer of permeable material. This could be used in security tagging applications. If the RFID tag is buried beneath a layer of permeable material, the presence of the tag is difficult to detect, and hence there is less chance of the tag being maliciously removed or damaged. In tagging for anti-counterfeit applications, the difficulty in reverse engineering the tag makes the production of counterfeit goods more difficult.

The invention claimed is:

1. A wireless power transmission system, designed to transmit power through a permeable conductive barrier layer of magnetic steel, comprising:
   a power transmitting circuit including a first inductive coil;
   a power receiving circuit including a second inductive coil located on the opposite side of the barrier layer of magnetic steel to the first inductive coil; and
   a biasing magnet or electromagnet, arranged to substantially saturate the magnetisation of the barrier layer of magnetic steel in a region adjacent to the first and second inductive coils,
   wherein the biasing magnet or electromagnet is provided with the DC bias current establishes a DC bias field to saturate the permeable conductive barrier layer of magnetic steel in a vicinity of the biasing magnet or electromagnet to increase a skin depth of the permeable conductive barrier layer of magnetic steel in the vicinity of the biasing magnet or electromagnet,
   wherein the skin depth characterises the depth to which electromagnetic energy will penetrate through a material,
   wherein the power transmitting circuit communicates a data signal and power through the saturated permeable conductive barrier layer of magnetic steel in the vicinity of the biasing magnet or electromagnet that is received by the power receiving circuit;
   wherein in response to communicating the data signal from the power transmitting circuit to the power receiving circuit, the power receiving circuit transmits a return data signal through the permeable conductive barrier layer of magnetic steel in the vicinity of the biasing magnet or electromagnet,
   wherein the return data is received by the power transmitting circuit; and
   wherein the return data is communicated using a modulated signal having a frequency range of 50 Hz to 10 kHz with the return data modulated on the 50 Hz to 10 kHz modulated signal.

2. A system according to claim 1, wherein the biasing magnet is a permanent magnet formed as a yoke around or through the first inductive coil.

3. A system according to claim 1, wherein the biasing magnet is an electromagnet and is provided with a DC bias current.

4. A system according to claim 1, wherein the first inductive coil and the biasing magnet are formed as a unitary component.

5. A system according to claim 1 wherein one or both of the first or second inductive coils are arranged also to operate as an electromagnetic acoustic transducer.

6. A system according to claim 1, further comprising an electromagnetic acoustic transducer coil associated with each of the first and second inductive coils.

7. A system according to claim 1 wherein the second inductive coil is connected to a circuit configured to operate as at least one of a sensor or RFID tag.

8. A system according to claim 1 wherein the permeable conductive barrier layer of magnetic steel is a permeable conductive barrier layer of magnetic stainless steel.

9. A system according to claim 1 wherein the power transmitting circuit is the biasing magnet or the electromagnet that receives the DC bias current.

10. A wireless power transmission system, designed to transmit power through a permeable conductive barrier layer of magnetic steel, comprising:
    a power transmitting circuit including a first inductive coil;
    a power receiving circuit including a second inductive coil located on the opposite side of the barrier layer of magnetic steel to the first inductive coil; and
    a biasing magnet or electromagnet, arranged to substantially saturate the magnetisation of the barrier layer of magnetic steel in a region adjacent to the first and second inductive coils,
    wherein the biasing magnet is an electromagnet and is provided with a DC bias current that establishes a DC bias field to saturate the permeable conductive barrier layer of magnetic steel in the vicinity of the biasing magnet or electromagnet to increase skin depth of the permeable conductive barrier layer of magnetic steel in the vicinity of the biasing magnet or electromagnet, wherein the skin depth characterises the depth to which electromagnetic energy will penetrate through a material, wherein the power transmitting circuit communicates a data signal and power through the saturated permeable conductive barrier layer of magnetic steel in the vicinity of the biasing magnet or electromagnet that is received by the power receiving circuit, wherein the data signal is an amplitude shift keying signal that is communicated from the power transmitting circuit to the power receiving circuit through the permeable conductive barrier layer of magnetic steel in the vicinity of the biasing magnet or electromagnet, and wherein the return data signal is a load shift keying signal that is communicated from the power receiving circuit to the power transmitting circuit through the permeable conductive barrier layer of magnetic steel in the vicinity of the biasing magnet or electromagnet, and wherein in response to communicating the data signal from the power transmitting circuit to the power receiving circuit, the power receiving circuit transmits a return data signal through the permeable conductive barrier layer of magnetic steel in the vicinity of the biasing magnet or electromagnet, wherein the return data is received by the power transmitting circuit.

11. A system according to claim 10 wherein the power transmitting circuit is the biasing magnet or the electromagnet that receives the DC bias current.

12. A wireless power transmission system, designed to transmit power through a permeable conductive barrier layer of magnetic steel, comprising:
   a power transmitting circuit including a first inductive coil;
   a power receiving circuit including a second inductive coil located on the opposite side of the barrier layer of magnetic steel to the first inductive coil; and
   a biasing magnet or electromagnet, arranged to substantially saturate the magnetisation of the barrier layer of magnetic steel in a region adjacent to the first and second inductive coils, wherein the biasing magnet is an electromagnet and is provided with a DC bias current,
   wherein the power transmitting circuit initially supplies first power through the permeable conductive barrier layer of magnetic steel in the vicinity of the biasing magnet or electromagnet, wherein a portion of the first power is received and stored by the power receiving circuit,
   wherein after the portion of first power is received and stored by the power receiving circuit, the power transmitting circuit stops supplying the first power and then provides second power through the permeable conductive barrier layer of magnetic steel in the vicinity of the biasing magnet or electromagnet,
   wherein the second power is a data signal that is detected by the power receiving circuit that has stored the portion of the first power.

13. A system according to claim 12 wherein the second power is a modulated 500 Hz signal with data modulated on the 500 Hz signal.

14. A system according to claim 13 wherein in response to communicating the data in the modulated 500 Hz signal from the power transmitting circuit to the power receiving circuit, the power receiving circuit transmits a return data that is a return modulated 500 Hz signal through the permeable conductive barrier layer of magnetic steel in the vicinity of the biasing magnet or electromagnet, wherein the return data is received by the power transmitting circuit.

15. A system according to claim 14 wherein the return data is communicated using the modulated 500 Hz signal with the return data modulated on the 500 Hz signal.

16. A system according to claim 14 wherein the return data is communicated using the modulated signal having a frequency range of 50 Hz to 50 kHz with the return data modulated on the 50 Hz to 50 kHz signal.

17. A system according to claim 14 wherein the return data is communicated using the modulated signal having a frequency range of 500 Hz to 10 kHz with the return data modulated on the 500 Hz to 10 kHz signal.

18. A system according to claim 14 wherein the return data is communicated using the modulated signal having a frequency range of substantially 500 Hz with the return data modulated on the 500 Hz to signal.

* * * * *